United States Patent
Jeon

(10) Patent No.: US 7,492,435 B2
(45) Date of Patent: Feb. 17, 2009

(54) COLOR FILTER SUBSTRATE HAVING A GRANULAR LIGHT-BLOCKING SPACER COMPRISING AN ELASTIC MATERIAL

(75) Inventor: Baek-Kyun Jeon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 270 days.

(21) Appl. No.: 10/980,602

(22) Filed: Nov. 4, 2004

(65) Prior Publication Data

US 2005/0122446 A1    Jun. 9, 2005

(30) Foreign Application Priority Data

Nov. 5, 2003    (KR)    ............ 10-2003-0077837

(51) Int. Cl.
*G02F 1/1339* (2006.01)
(52) U.S. Cl. ............... 349/155; 349/106; 349/110
(58) Field of Classification Search ........... 349/155, 349/110, 106, 156, 43, 138
See application file for complete search history.

(56) References Cited

U.S. PATENT DOCUMENTS

| | | | | |
|---|---|---|---|---|
| 5,615,030 A | * | 3/1997 | Harada et al. | 349/110 |
| 5,942,292 A | * | 8/1999 | Yoneda et al. | 428/402 |
| 6,275,280 B1 | * | 8/2001 | Kajita et al. | 349/155 |
| 6,466,279 B1 | * | 10/2002 | Nakata | 349/42 |
| 6,466,295 B1 | * | 10/2002 | Hsieh | 349/155 |
| 6,816,210 B2 | * | 11/2004 | Chen | 349/44 |
| 6,864,945 B2 | * | 3/2005 | Fujimori et al. | 349/156 |
| 6,897,918 B1 | * | 5/2005 | Nonaka et al. | 349/106 |
| 6,897,920 B2 | * | 5/2005 | Lee et al. | 349/110 |
| 7,023,514 B2 | * | 4/2006 | Shin et al. | 349/138 |

FOREIGN PATENT DOCUMENTS

| JP | 05-216048 | 8/1993 |
|---|---|---|
| JP | 09-292619 | 11/1997 |

* cited by examiner

*Primary Examiner*—Thoi V Duong
(74) *Attorney, Agent, or Firm*—Cantor Colburn LLP

(57) ABSTRACT

A color filter substrate enhances image quality and reduces light leakage. The method of manufacturing the same is also disclosed. The color filter substrate includes a substrate, a color filter, a light-blocking member and a plurality of granular light-blocking spacers. The substrate includes a light blocking area. The color filter is disposed on the substrate. The light-blocking member is disposed in the light blocking area on the substrate. The granular light-blocking spacers are disposed in the light blocking area, thereby reducing the light leakage, enhancing the image quality, and simplifying manufacturing process.

22 Claims, 21 Drawing Sheets

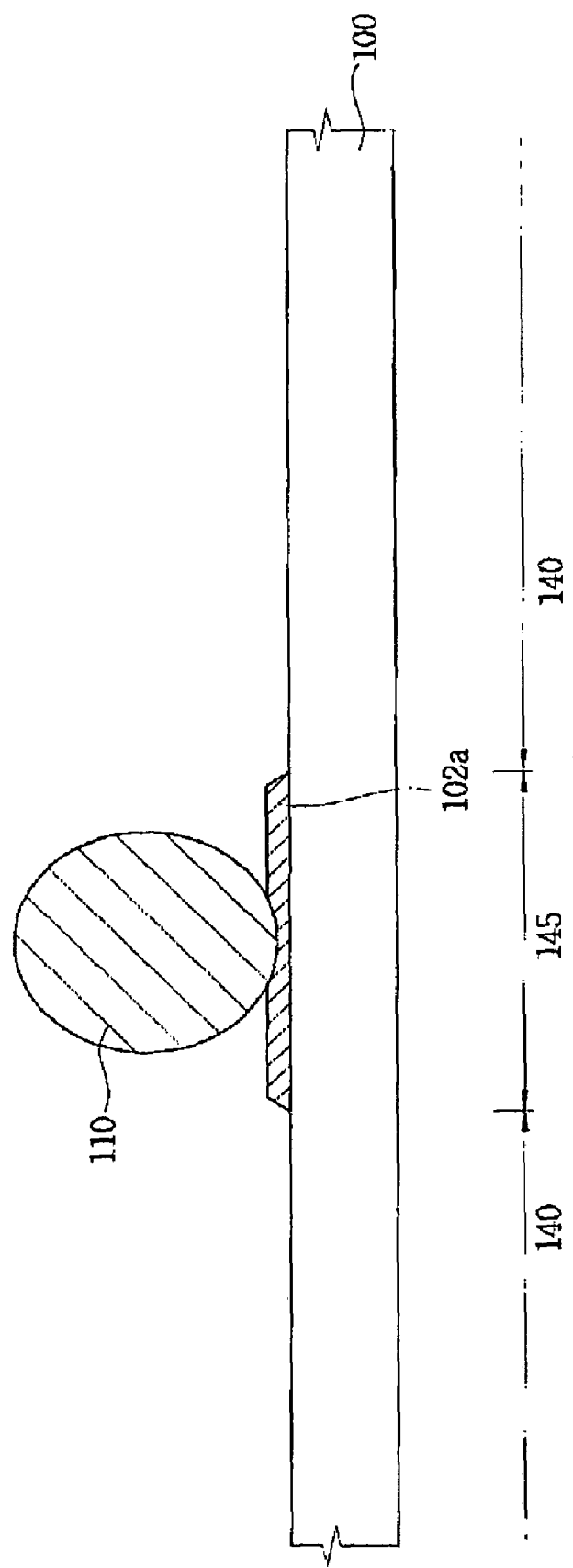

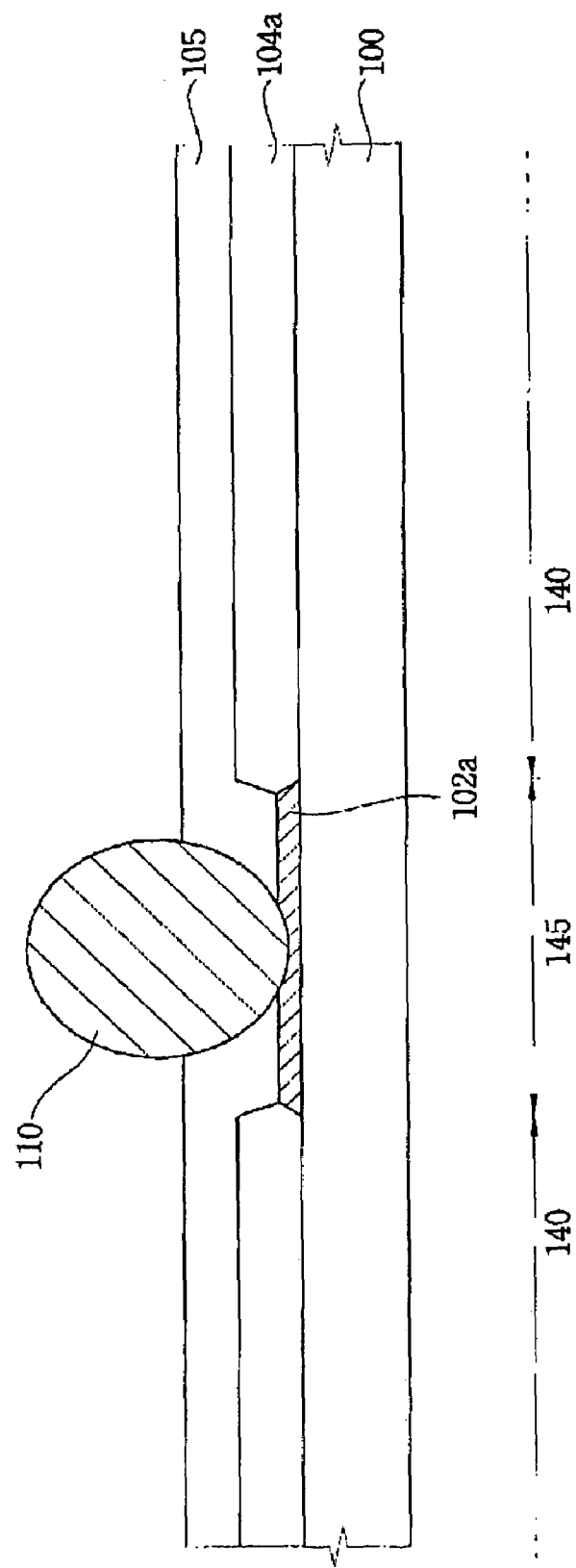

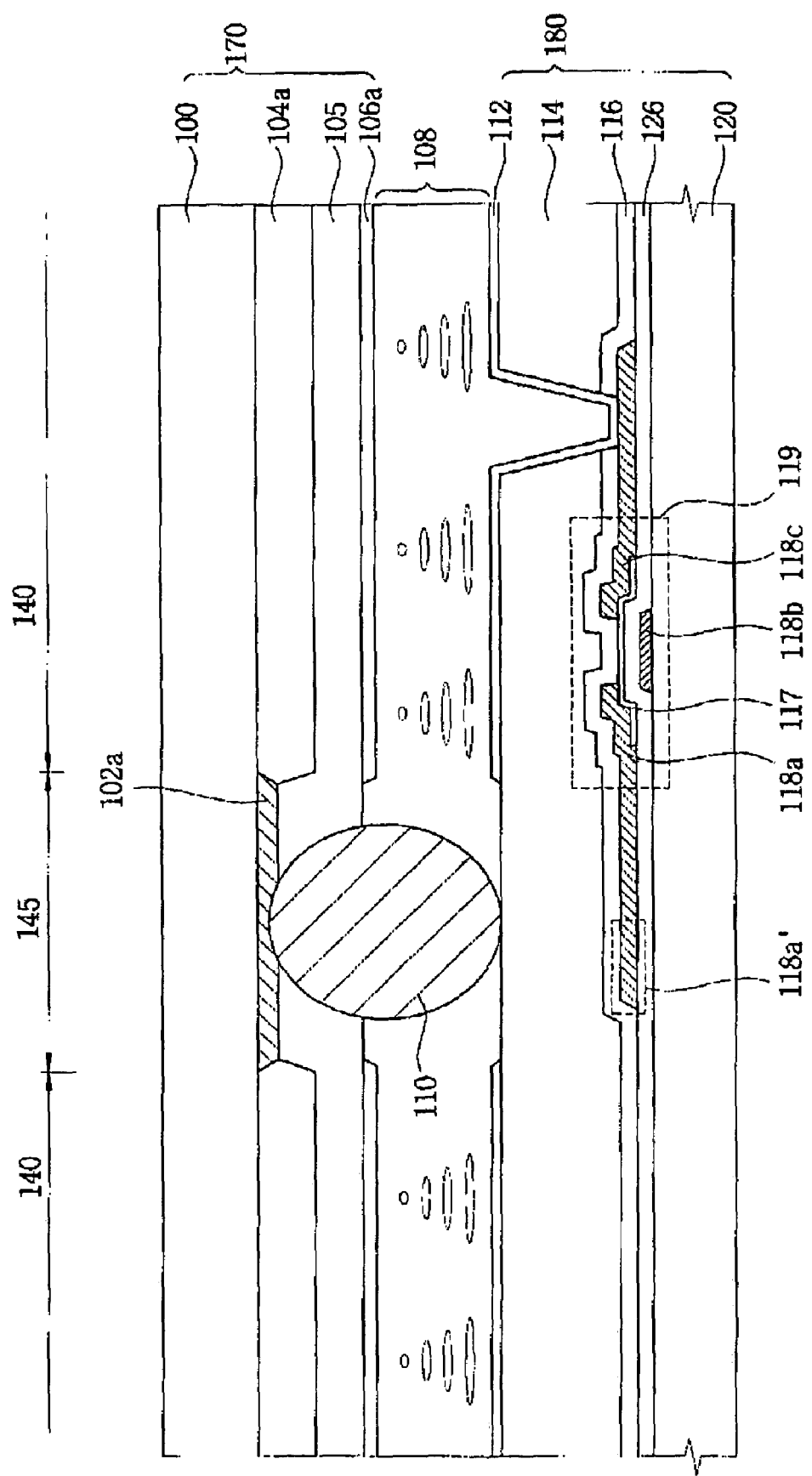

COLOR FILTER SUBSTRATE HAVING A GRANULAR LIGHT-BLOCKING SPACER COMPRISING AN ELASTIC MATERIAL

This application claims benefit of Korean Patent Application No. 2003-77837, filed on Nov. 5, 2003, which is hereby incorporated by reference for all purposes as if fully set forth herein.

BACKGROUND OF THE INVENTION

1. Field of the Invention

The invention relates to a color filter substrate and method of manufacturing the same, and more particularly to a color filter substrate that improves display quality.

2. Discussion of the Related Art

Typically, a liquid crystal display (LCD) apparatus includes an array substrate having thin film transistors (TFTs) arranged thereon, a color filter substrate, and a liquid crystal layer having an anisotropic dielectric constant. The LCD apparatus applies an electric field of controllable intensity to the liquid crystal layer disposed between the array substrate and the color filter substrate for obtaining a desired image signal.

A conventional LCD apparatus includes a first substrate, a second substrate, a liquid crystal layer, and a spacer. The spacer maintains a uniform cell gap between the first substrate and the second substrate. A response time is required to respond between black and white of LCD apparatus. Contrast ratio, viewing angle and brightness uniformity, etc., vary in accordance with a thickness of the liquid crystal layer. The spacer may be formed into a number of different types and shapes, for example, a bead spacer, a column spacer, a conductive spacer, and the like. Generally, the bead spacer may have spherical shape and includes a plastic material having an elasticity. The bead spacer is randomly arranged between the first substrate and the second substrate. The cell gap may be uniformly maintained by increasing the number of bead spacer. However, increased number of bead spacers disturb the alignment of liquid crystal layer, decreasing the image quality of the LCD apparatus.

The column spacer is formed integrally with the first substrate. When manufacturing the first substrate, the position adjustment of the column spacer prevents liquid crystal layer alignment disturbances. However, the column spacer requires an additional photo process (e.g., photolithography process), increasing the manufacturing costs. Also, the column spacer is less elastic than the bead spacer, and thus generating air bubbles as the temperature of liquid crystal layer changes, thereby causing a volume change.

To overcome such problems as described above, Japanese Patent (JP-Heisei 9-292619 entitled "LCD apparatus and method for manufacturing the same" issued to Yamada Satoshi) describes a bead spacer integrally disposed with the black matrix. Additionally, Japanese Patent (JP-Heisei 5-216048 entitled "LCD electro-optic apparatus and method for manufacturing the same" issued to Sugiyama Nobuo) discloses that photoresist and bead spacer are coated and they are selectively removed by a photolithography step to dispose the bead spacer on a predetermined position.

Disclosed solutions have a number of disadvantages. For example, the light-blocking property of the black matrix may become deteriorated as a portion of the light passes through the bead spacer. As a result, the light may leak, thereby deteriorating the contrast ratio and image quality of the display.

Moreover, image quality may deteriorate as the size of a mother substrate is scaled up because of misalignment between a first mother substrate and a second mother substrate reduces.

SUMMARY OF THE INVENTION

Accordingly, the present invention is directed to a color filter substrate and method of manufacturing the same that substantially obviates one or more of the problems due to limitations and disadvantages of the related art.

The present invention discloses a color filter substrate having a high display quality. The present invention provides a color filter substrate and the liquid crystal display apparatus having the color filter substrate including a granular masking spacer arranged together with the black matrix in the masking region that reduces light leakage and enhances image quality.

The present invention discloses a granular masking spacer formed with the black matrix that simplifies the manufacturing process. Another aspect of the present invention is to minimize external and internal impacts of the apparatus due to elasticity of the spacer.

Additional aspects of the invention will be set forth in the description which follows, and in part will be apparent from the description, or may be learned by practice of the invention. These may be achieved and realized by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to further explain the invention.

FIGS. 4A, 4B, 4C, 4D, 4E, 4F, 4G, and 4H show cross-sectional views according to a first exemplary embodiment of the present invention.

DETAILED DESCRIPTION OF THE INVENTION

Reference will now be made in detail to embodiments of the present invention, examples of which are illustrated in the accompanying drawings.

Figure 1:
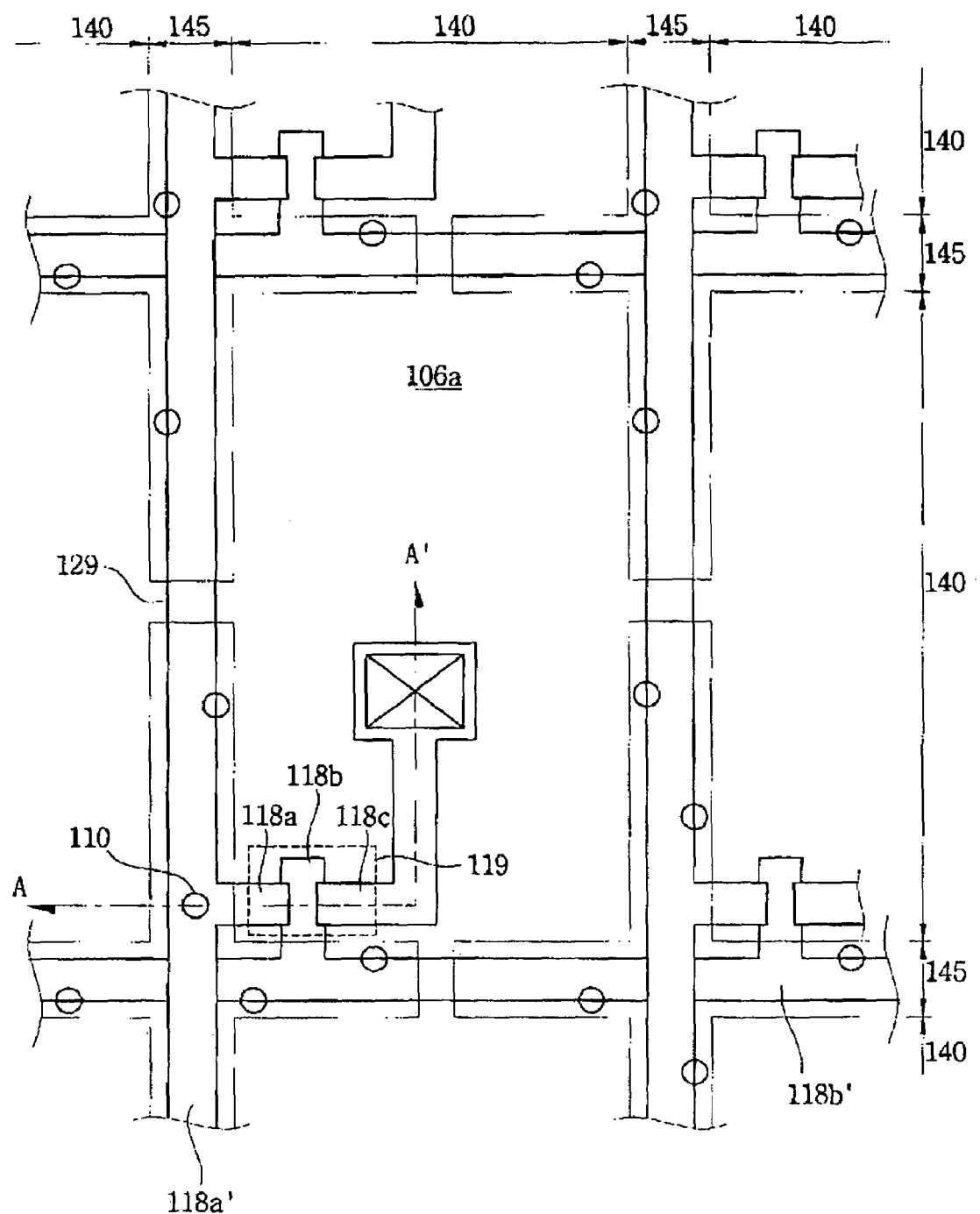
FIG. 1 shows a plan view of a liquid crystal display apparatus according to a first exemplary embodiment of the present invention.
Figure 2:
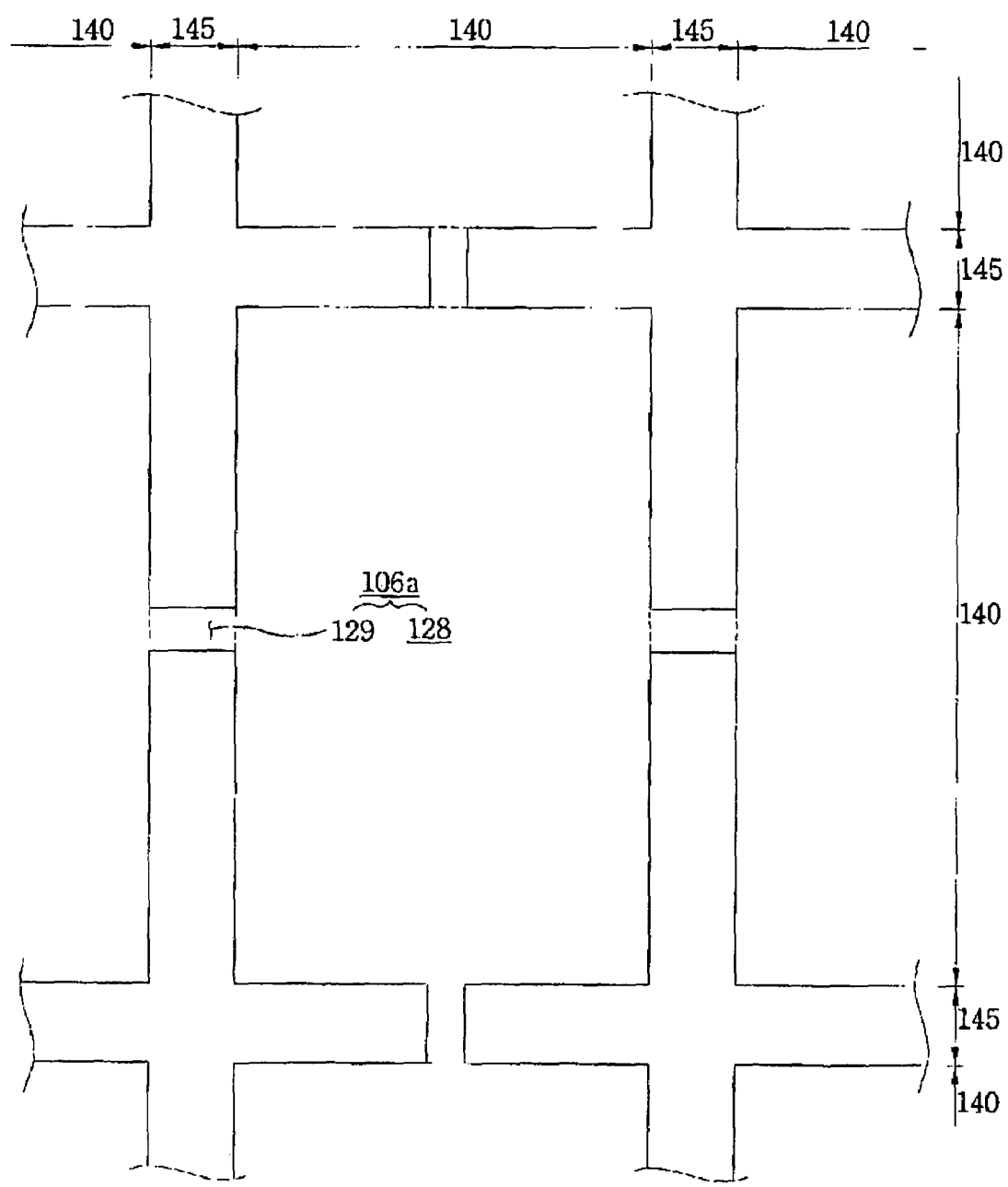
FIG. 2 shows a plan view of a common electrode of the liquid crystal display apparatus of FIG. 1.
Figure 3:
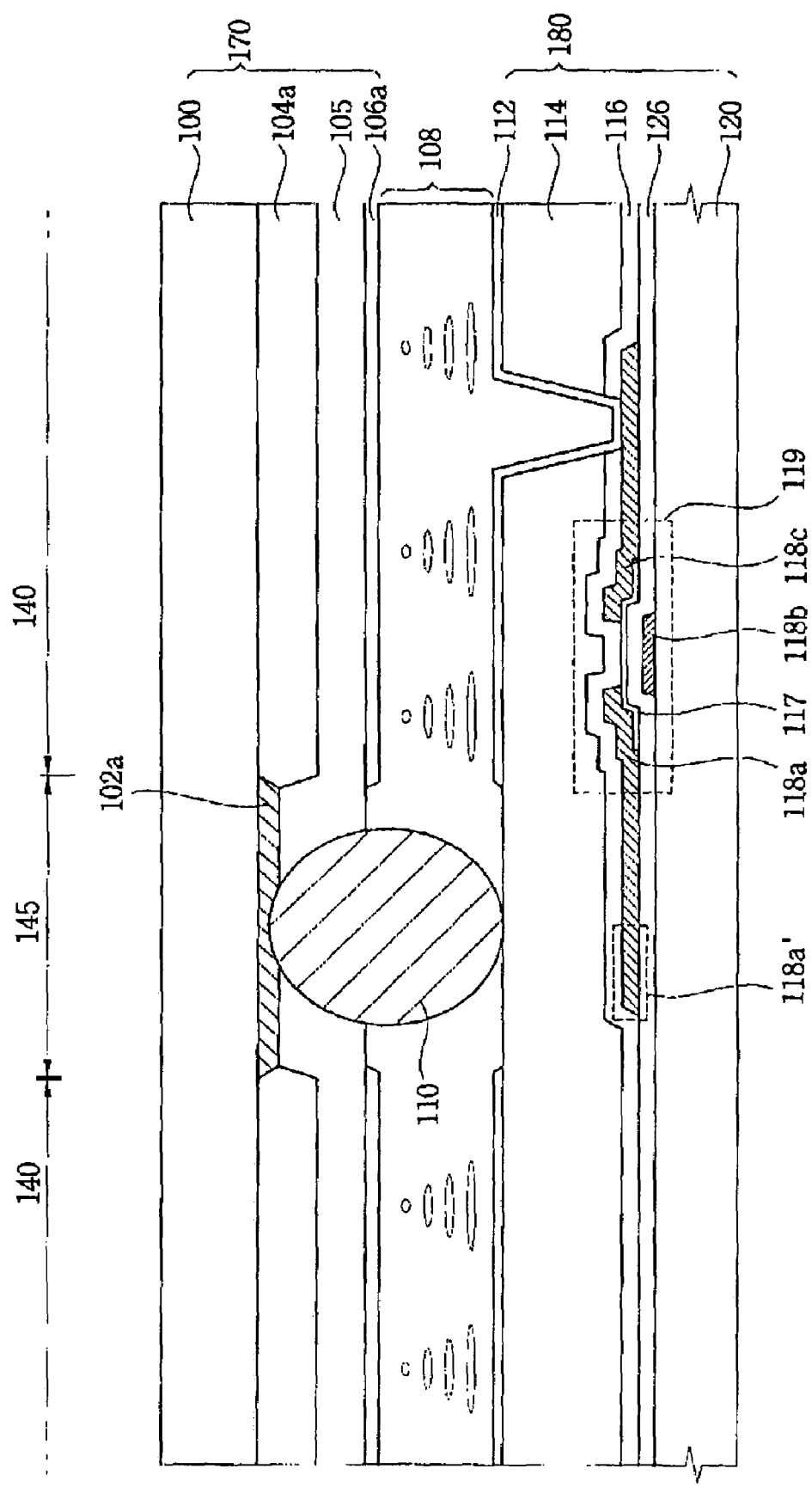
FIG. 3 shows a cross-sectional view taken along the line A-A' of FIG. 1.

FIG. 1 shows a plan view of a liquid crystal display apparatus according to a first exemplary embodiment of the present invention. FIG. 2 shows a plan view of a common electrode of the liquid crystal display apparatus of FIG. 1. FIG. 3 shows a cross-sectional view taken along the line A-A' of FIG. 1.

Referring to FIGS. 1, 2, and 3, a liquid crystal display (LCD) apparatus includes a first substrate 170, a second substrate 180, a liquid crystal layer 108 and a granular light-blocking spacer 110. The first substrate 170 includes an upper substrate 100, a black matrix 102a, a color filter 104a, an overcoating layer 105, and a common electrode 106a. The second substrate 180 includes a lower substrate 120, a thin film transistor (TFT) 119, a source line 118a', a gate line 118b', a gate insulating layer 126, a passivation layer 116, an organic layer 114, and a pixel electrode 112. The first substrate 170 includes a pixel area 140 and a light blocking area 145.

The pixel area 140 is an area where an image is displayed by adjusting an arrangement of liquid crystal material. The color filter 104a and the common electrode 106a are positioned at the pixel area 140. The light blocking area 145 is an area where the light is blocked because the arrangement of the liquid crystal corresponding to the light blocking area 145 may not be adjusted. The black matrix 102a is arranged at the light blocking area 145.

The upper substrate 100 and lower substrate 120 include transparent glass in order for the light to be transmitted through the upper substrate 100 and lower substrate 120. The glass generally does not have an alkali metal ion. If the glass includes the alkali metal ion, the alkali metal ion of the glass may be dissolved in a liquid crystal cell. The alkali metal ion may deteriorate display properties of the LCD apparatus due to a low resistivity of the liquid crystal.

The black matrix 102a is arranged at the light blocking area 145 to substantially block the light. The granular light-blocking spacer 110 may be adhered to the upper substrate 100 by using the black matrix 102a as an adhesive.

In this exemplary embodiment, the black matrix 102a includes a photoresist material having black pigment, or the like. Also, the black matrix 102a may further include polycarbonate, and the like.

The granular light-blocking spacer 110 is disposed on the black matrix 102a formed on the upper substrate 100. The granular light-blocking spacer 110 uniformly maintains a cell gap between the first substrate 170 and second substrate 180.

The granular light-blocking spacer 110 may be formed into a number of different geometric shapes, for example, a spherical shape, a cube shape, a polyhedron-like shape, and the like. Also, the granular light-blocking spacer 110 may include a bead spacer having a spherical shape.

The granular light-blocking spacer 110 may include a synthetic resin having black pigment. Also, the granular light-blocking spacer 110 may further include a black dye. The synthetic resin includes a thermoplastic or thermoset resin having an elasticity so as to absorb external and/or internal impacts within the apparatus.

A cross-sectional area of the granular light-blocking spacer 110 may be set to be about 20% (percent) lower than the cross-sectional area of the black matrix 102a. In case that the cross-sectional area of the granular light-blocking spacer 110 is greater than about 20% of the cross-sectional area of the black matrix 102a, the granular light-blocking spacers 110 may become superimposed with each other causing non-uniformity of cell gaps. Additionally, cross-sectional area of the granular light-blocking spacer 110 may be about 10% (percent) below cross-sectional area of the black matrix 102a.

The width ratio of the granular light-blocking spacer 110 and the black matrix 102a may be in a range from about 1:3 to about 1:6. However, when the width ratio is greater than about 1:3 and alignment of liquid crystals near the granular light-blocking spacer 110 is poor, the black matrix 102a may not block light that passes through poorly aligned liquid crystals and as a result, decreasing the image quality of the apparatus. Additionally, when the width ratio is above about 1:6, the area for blocking the light becomes too wide and reduces the opening rate. For example, when the width of the granular light-block spacer 110 is 10 μm and the width ratio is 1:3, the width of the black matrix 102a would be 30 μm. However, when the width of the granular light-blocking spacer 110 is 10 μm and the width ratio is 1:6, the width of the black matrix 102a would be 60 μm. Thus, as the width ratio increases, the width of the black matrix 102a also increases, thereby decreasing the opening rate. In this embodiment the width ratio is set to about 1:5.

Additionally, the width of the granular light-blocking spacer 110 may be formed to be in the range of about 6 to about 10 μm and the width of the black matrix 102a may be formed to be in the range of about 27 to about 33 μm.

The color filter 104a selectively transmits light of a predetermined wavelength and is formed on the upper substrate 100 on which the black matrix 102a and the granular light-blocking spacer 110 are formed.

The overcoating layer 105 is arranged on the upper substrate 100 to reduce the step-differences caused by the black matrix 102a and the color filter 104a and to partially protrude from the granular light-blocking spacer 110. The overcoating layer 105 may include an organic layer of a transparent material.

The common electrode 106a is arranged on the overcoating layer 105. The common electrode 106a includes a transparent conductive material. The transparent conductive material may be, for example, indium tin oxide (ITO), indium zinc oxide (IZO), zinc oxide (ZO), and the like.

The common electrode 106a is discontinuous in the light blocking area 145 in order to prevent a short between the common electrode 106a and the pixel electrode 112 that may be caused by misalignment between the upper substrate 170 and the lower substrate 180. For example, the common electrode 106a may be partially opened up to expose the granular light-blocking spacer 110.

Referring to FIG. 2, the common electrode 106a includes a bridge 129 that connects a plurality of pixel area electrodes 128 disposed in the pixel area 140 and the pixel area electrodes neighboring the pixel area 140.

Furthermore, in another exemplary embodiment, the common electrode 106a may be formed to be substantially parallel with the pixel electrode 112 arranged on the organic layer 114 of the second substrate 180.

The TFT 119 formed on the lower substrate 120 includes a source electrode 118a, a gate electrode 118b, a drain electrode 118c, and a semiconductor layer pattern 117. A driving circuit (not shown) outputs a data voltage to the source electrode 118a via a source line 118a' and outputs a selecting signal to the gate electrode 118b via the gate line 118b'.

The semiconductor layer pattern 117 is arranged on the gate insulating layer 126. When the selecting signal is applied to the gate electrode 118b, an electrical current flows between the source electrode 118a and the drain electrode 118c via the semiconductor layer pattern 117.

A storage capacitor (not shown) is formed on the lower substrate 120 and maintains an electric potential difference between the common electrode 106a and the pixel electrode 112. The storage capacitor (not shown) may be formed from an end gate method or an isolated wire method.

The gate insulating layer 126 is arranged on the lower substrate 120 including the gate electrode 118b and the gate line 118b'. Accordingly, the gate electrode 118b and gate line 118 are electrically isolated from the source electrode 118a and the drain electrode 118c. The gate insulating layer 126 may include a number of different insulating materials, for example, silicon nitride (SiNx), and the like.

The passivation layer 116 is arranged on the lower substrate 120 including the TFT 119. The passivation layer 116 includes an opening (e.g., via hole) that partially exposes the drain electrode 118c. The passivation layer 116 may include an insulating material, for example, silicon nitride (SiNx), and the like.

The organic layer 114 is arranged on the passivation layer 116 including a via hole to partially expose the drain electrode 118c. The passivation layer 116 and the organic layer 114 insulate the TFT 119 and the pixel electrode 112. The thickness of the liquid crystal layer 108 may be adjusted by adjusting the thickness of the organic layer 114. Also, the organic layer 114 substantially planarizes the surface of the lower substrate 120. That is, it substantially planarizes the different heights of the TFT 119, the source line 118a', the gate line 118b', and the like. In this exemplary embodiment, the organic layer 114 may be formed to have a plurality of different cell gaps. For example, an upper surface of the organic layer 114 may have a plurality of recesses and a plurality of protrusions, thereby creating a plurality of different cell gaps.

The pixel electrode 112 formed in the pixel area 140 is electrically connected to the drain electrode 118c through an opening (e.g., via hole) of the organic layer 114 and passivation layer 116. Light transmittance may be adjusted by varying a voltage applied between the pixel electrode 112 and the common electrode 106a, thereby controlling liquid crystals in the liquid crystal layer 108. The pixel electrode 112 comprises transparent conductive materials. For example, the pixel electrode 112 may be formed from indium tin oxide (ITO), indium zinc oxide (IZO), zinc oxide (ZO), and the like. In this exemplary embodiment, a reflective electrode (not shown) that reflects external light and may be partially arranged on the organic layer 114 and/or on the pixel electrode 112. Optionally, the pixel electrode 112 may be arranged between the organic layer 114 and the passivation layer 116.

The driving circuit (not shown) provides a data voltage to the pixel electrode 112 through the TFT 119, thereby forming an electric field between the common electrode 106a and the pixel electrode 112.

The liquid crystal layer 108 may be arranged between the first substrate 170 and the second substrate 180, and is sealed by a sealant (not shown). The liquid crystals in the liquid crystal layer 108 may be arranged in a vertical alignment (VA) mode, a twisted nematic (TN) mode, a mixed twisted nematic (MTN) mode, or a homogeneous mode.

An alignment layer (not shown) used to align the liquid crystal is disposed on surface of the first substrate 170 and second substrate 180. A rubbing method may be used on the surface of the alignment layer, for example, in the same direction as part of the alignment procedure.

FIGS. 4A, 4B, 4C, 4D, 4E, 4F, 4G, and 4H show cross-sectional views of a liquid crystal display apparatus according to a first exemplary embodiment of the present invention. More specifically, FIGS. 4A, 4B, 4C, 4D, 4E, 4F, 4G, and 4H, represent intermediate process steps for forming a color filter substrate accordingly to the first exemplary embodiment.

Figure 4A:
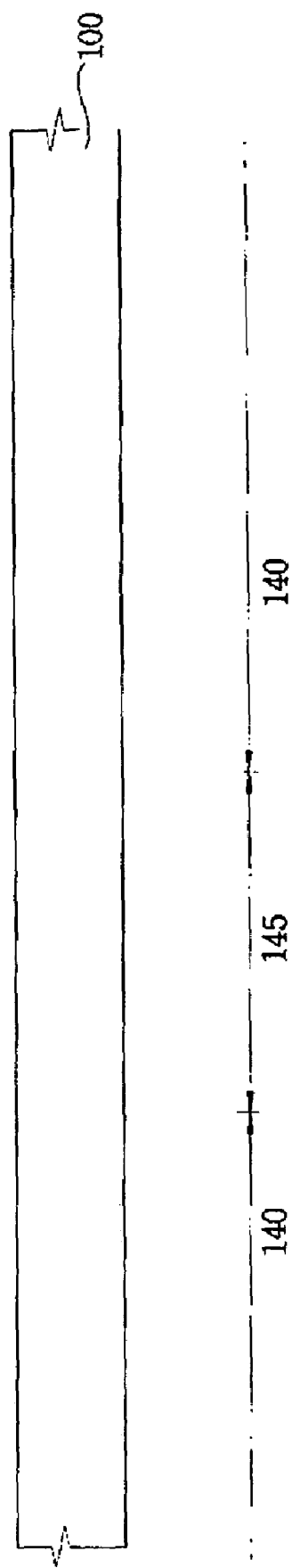

Referring to FIG. 4A, the upper substrate 100 is divided into a pixel area 140 and a light blocking area 145. Again, the pixel area 140 is where the image will be displayed and the light blocking area 145 is where the light is substantially blocked for reasons as explained herein.

Figure 4B:
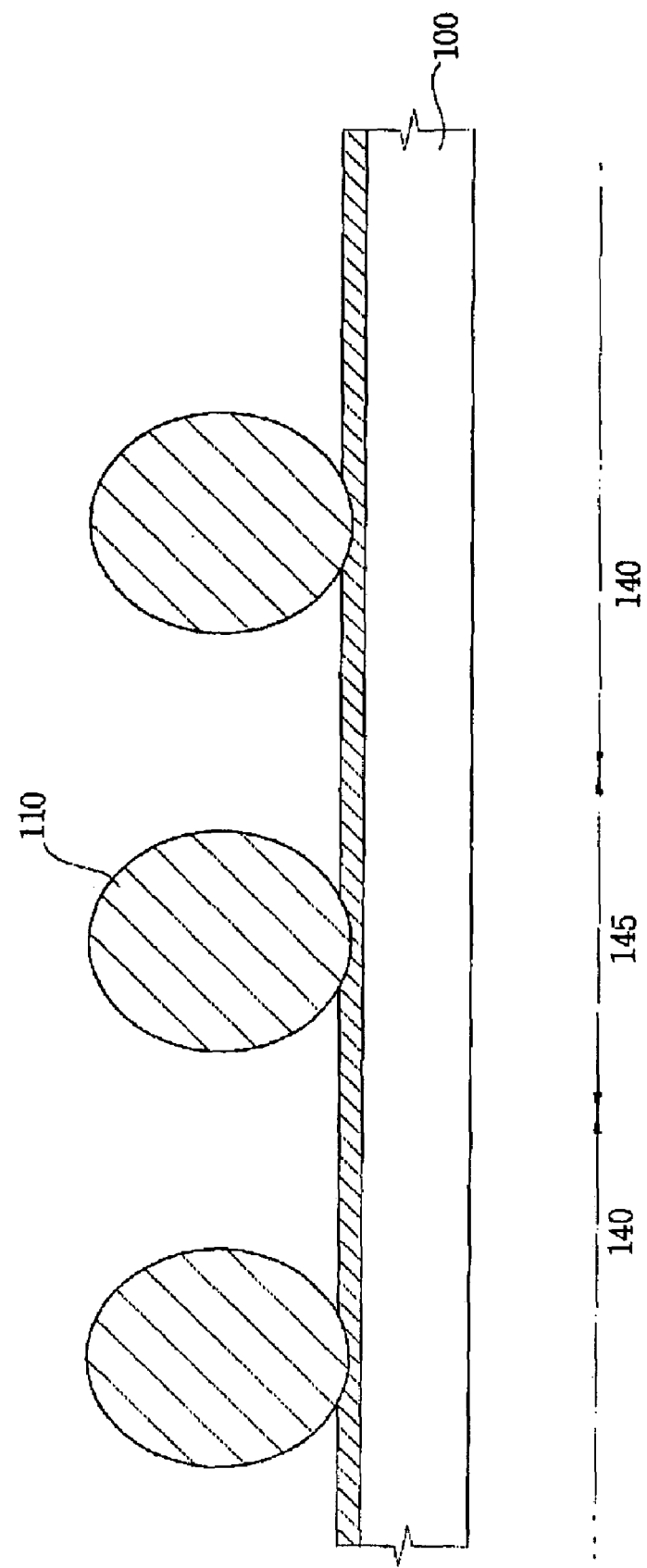

Referring to FIG. 4B, a black photoresist that includes the granular light-blocking spacer 110 is formed on the upper substrate 100. For example, the black photoresist is formed via a slit coating process, spin-on coating process, or the like. In this exemplary embodiment, the black photoresist is coated via the slit coating process. More specifically, a mixture of the granular light-blocking spacer 110 and the black photoresist are ejected through a slit onto the upper substrate 100 with a substantially uniform thickness. Next, the granular light-blocking spacer 110 is arranged on the upper substrate 100 with the black photoresist. In this exemplary embodiment, the black photoresist may be a positive photoresist or negative photoresist. That is, a positive photoresist where an exposed portion of the photoresist is removed after a developing process or a negative photoresist where an exposed portion of the photoresist remains after a developing process.

Referring FIG. 4C, the coated granular light-blocking spacer 110 and the black photoresist are exposed with ultraviolet (UV) light using a mask (not shown). Since the granular light-blocking spacer 110 may block the light, the UV light is irradiated onto a side opposite from a side where the photoresist is coated. The mask (not shown) includes an opaque portion that does not transmit the UV light and a transparent portion that transmits the UV light. The opaque portion of the mask is arranged to correspond to the light blocking area 145 and the transparent portion is arranged to correspond to the pixel area 140.

When using a positive black photoresist, molecular bonds are broken in a portion where the UV light is irradiated, thereby reducing the amount of molecules of the black photoresist in that portion. That is, the molecular bonds of the black photoresist in the pixel area 140 are broken. The black photoresist in the light blocking area 145 (i.e., where the UV light is not transmitted) maintains its molecular bonds in a polymer.

The exposed granular light-blocking spacer 110 and the black photoresist are developed. The portion of the black photoresist having reduced molecules and granular light-blocking spacers 110 in the pixel area 140 is removed. Accordingly, the granular light-blocking spacer 110 in the light blocking area 145 and the black matrix 102a area remain.

Figure 4D:
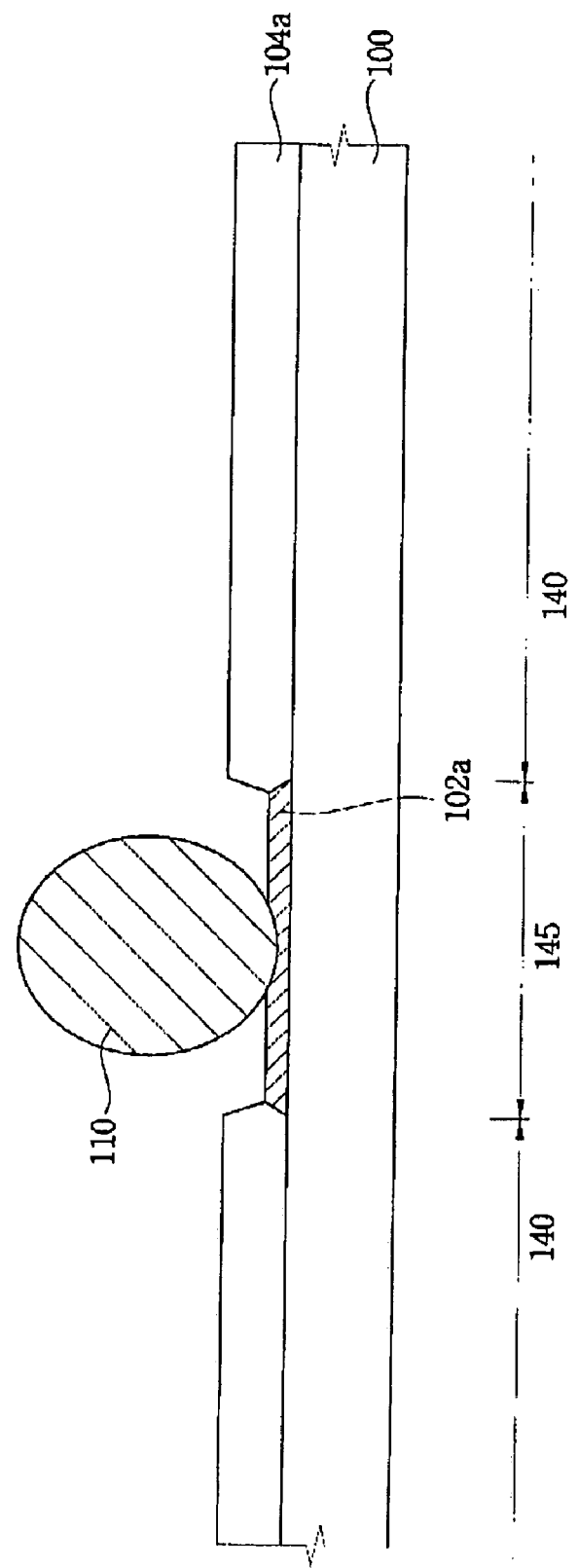

Referring to FIG. 4D, after forming the black matrix 102a and the granular light-blocking spacer 110, a color filter 104a is formed thereon. The color filter 104a selectively transmits light of a predetermined wavelength. Next, the color filter 104a is coated with a photoresist including pigment and the photoresist is exposed and developed and used to form the color filter 104a into a desired pattern. Alternatively, the black matrix 102a and the granular light-blocking spacer 110 may be formed after the color filter 104a.

Referring to FIG. 4E, a transparent organic material is formed on the upper substrate 100, thereby forming the overcoating layer 105. The overcoating layer 105 reduces the step-differences caused by the different heights of the color filter 104a and the black matrix 102a. Additionally, the overcoating layer 105 is formed to allow a portion of the granular light-blocking spacer 110 to protrude from the overcoating layer 105.

Figure 4F:
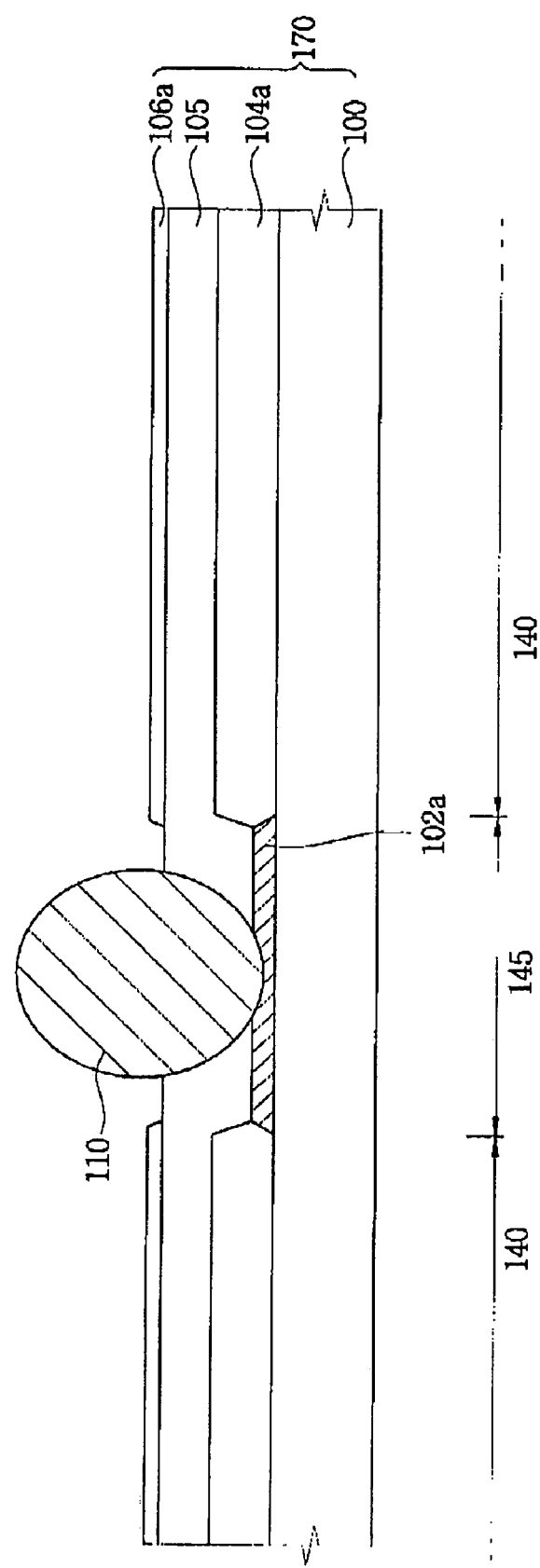

Referring to FIG. 4F, a transparent conductive material is formed on the overcoating layer 105. The transparent conductive material corresponding to the light blocking area 145 is partially removed through a photolithography process to form a common electrode 106a into a predetermined pattern. For example, forming the common electrode 106a to include a bridge 129 (not shown in FIG. 4F) that connects a plurality of pixel area electrodes in the pixel area 140 and adjacent pixel area electrodes. Accordingly, the first substrate includes the upper substrate 100, the black matrix 102, the granular light-blocking spacer 110, the color filter 104a, the overcoating layer 105, and the common electrode 106a.

Figure 4G:
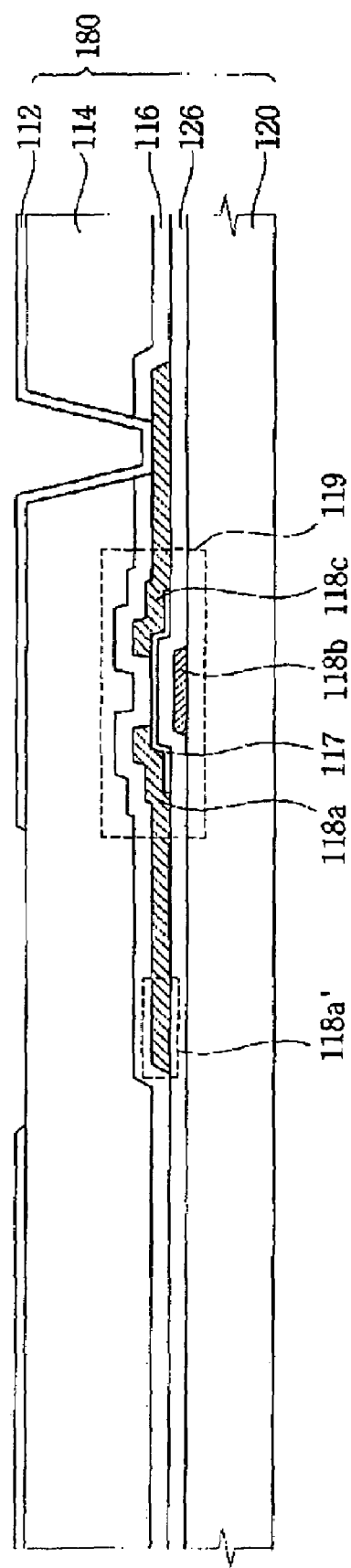

Referring to FIG. 4G, a conductive material is deposited on the lower substrate 120. The conductive material is partially removed (e.g., etched) to form the gate electrode 118b and the gate line 118b'. Further, the gate insulting layer 126 is deposited on the lower substrate 120 including the gate electrode 118b and the gate line 118b'. The gate insulting layer 126 includes a transparent insulating material. For example, the gate insulating layer 126 includes silicon nitride (SiNx), and the like.

An amorphous silicon layer and a doped amorphous silicon layer, for example, N+ amorphous silicon layer are formed on the lower substrate 120 and patterned (e.g., etched) to form the semiconductor layer 117 on the gate insulating layer 126 corresponding to the gate electrode 118b. The conductive material is deposited on the gate insulating layer 126 on which the semiconductor layer 117 is formed. The conductive material is patterned and etched to form the source electrode 118a, the source line 118a' and the drain electrode 118c. Accordingly, the TFT 119 includes the source electrode 118a, the gate electrode 118b, the drain electrode 118c, and the semiconductor layer 117.

A transparent insulating material is deposited on the lower substrate 120 and formed into the passivation layer. The transparent insulating material includes, for example, silicon nitride (SiNx), and the like. Subsequently, the passivation layer is partially removed to form an opening, thereby exposing a portion of the drain electrode 118c. The opening may be formed after the formation of the organic layer 114.

An organic layer is formed by forming an organic material over the passivation layer 116. The organic material may include a photoresist material. The organic layer is exposed and developed to form an organic layer 114 through which the drain electrode 118c is partially exposed. The recesses (not shown) and the protrusions (not shown) may be formed on an upper surface of the organic layer 114.

A transparent conductive material is deposited on the organic layer 114 and the passivation layer 116. The transparent conductive material may include at least one of (ITO), indium zinc oxide (IZO), zinc oxide (ZO), and the like. The transparent conductive material is partially etched to form the pixel electrode 112 in the pixel area 140. Optionally, a reflective electrode (not shown) may be formed on the organic layer 114 and the pixel electrode 112.

Accordingly, the second substrate 180 includes the lower substrate 120, the TFT 119, the source line 118a', the gate line 118b', the organic layer 114, and the pixel electrode 112.

Referring to FIG. 4H, the first substrate 170 and the second substrate 180 are combined with each other. The liquid crystal layer 108 is disposed between the first substrate 170 and second substrate 180 by injecting the liquid crystal and sealing with a sealant (not shown). Alternatively, the liquid crystal layer 108 may be formed by dropping the liquid crystal on the first substrate 170 or the second substrate 180 on which the sealant (not shown) is formed and combining the first substrate 170 and second substrate 180.

The granular light-blocking spacer 110, including an opaque material, is disposed together with the black matrix 102a in the light blocking area 145, thereby reducing leakage of light and enhancing image quality. It simplifies the LCD apparatus manufacturing process as the granular light-blocking spacer 110 and the black matrix 102a may be formed through one process. Furthermore, the granular light-blocking spacer 110 may absorb internal or external impacts of the LCD apparatus due to the elasticity of the granular light-blocking spacer 110.

Figure 5:
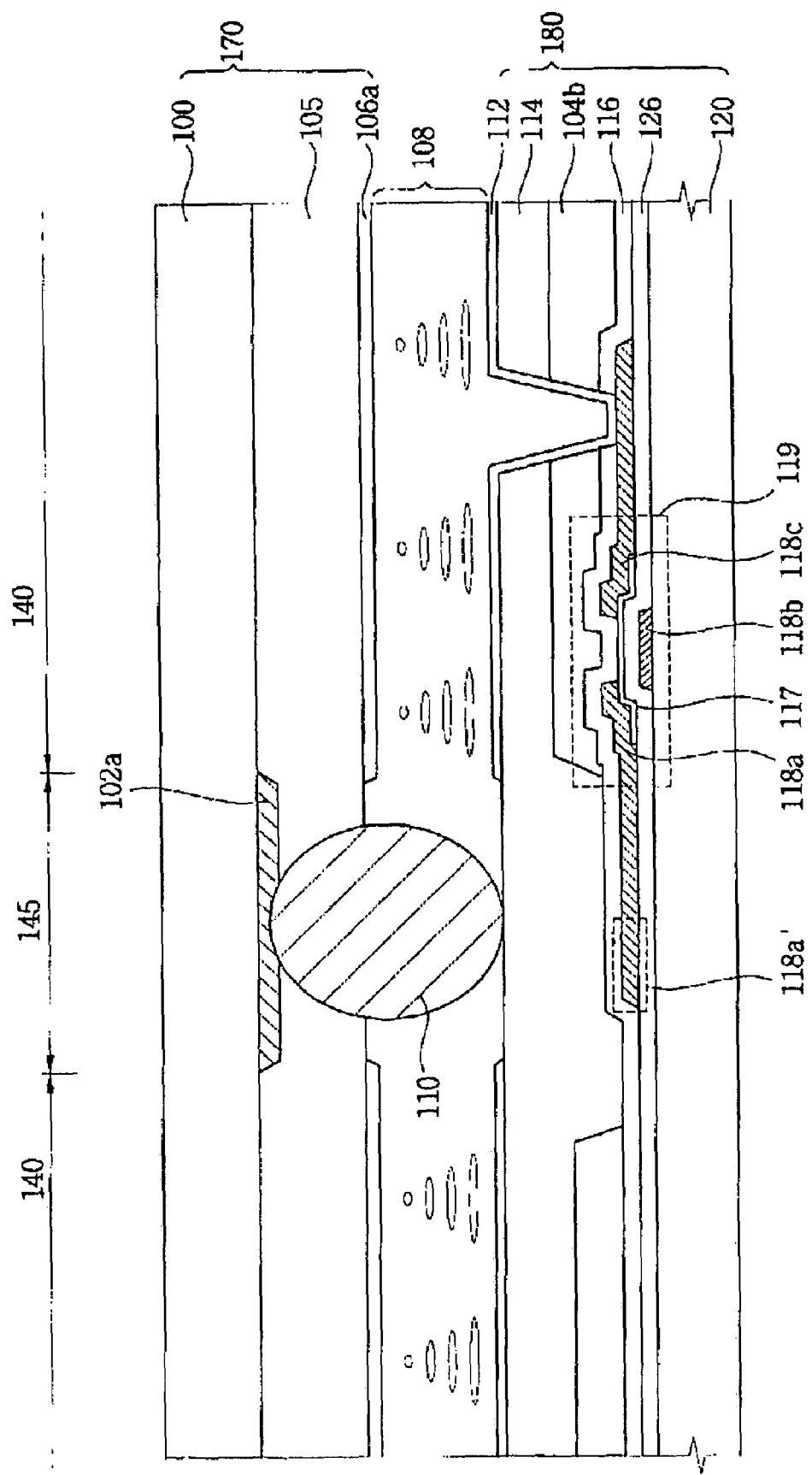
FIG. 5 shows a cross-sectional view of a liquid crystal display apparatus according to a second exemplary embodiment of the present invention.

FIG. 5 shows a cross-sectional view of a liquid crystal display apparatus according to a second exemplary embodiment of the present invention. In FIG. 5, similar reference numerals denote the similar elements as shown in FIG. 1 and detailed descriptions of these elements may not be repeated.

Referring to FIG. 5, a first substrate 170 includes an upper substrate 100, a black matrix 102a, an overcoating layer 105, and a common electrode 106a. A second substrate 180 includes a lower substrate 120, a TFT 119, a source line 118a', a gate line 118b' (not shown), a gate insulating layer 126, a passivation layer 116, a color filter 104b, an organic layer 114, and a pixel electrode 112. The TFT 119 includes a source electrode 118a, a gate electrode 118b, a drain electrode 118c, and a semiconductor patterned layer 117.

In this embodiment, the color filter 104b is arranged between the passivation layer 116 and the organic layer 114. The color filter 104b may be disposed between the organic layer 114 and the passivation layer 116. Alternatively, the color filter 104b may be arranged between the pixel electrode 112 and the organic layer 114. Optionally, the organic layer 114 is not formed and the color filter 104b is arranged between the pixel electrode 112 and the passivation layer 116.

Misalignment between the first substrate 170 and second substrate 180 may occur by disposing the color filter 104b between the passivation layer 116 and the organic layer 114. However, alignment of the color filter 104b and the pixel electrode 112 is maintained. This is because the color filter 104b is formed on the second substrate 180 together with the pixel electrode 112 and, hence, the locations of the color filter 104b and the pixel electrode 112 are independent from the location of the first substrate 170.

Figure 6:
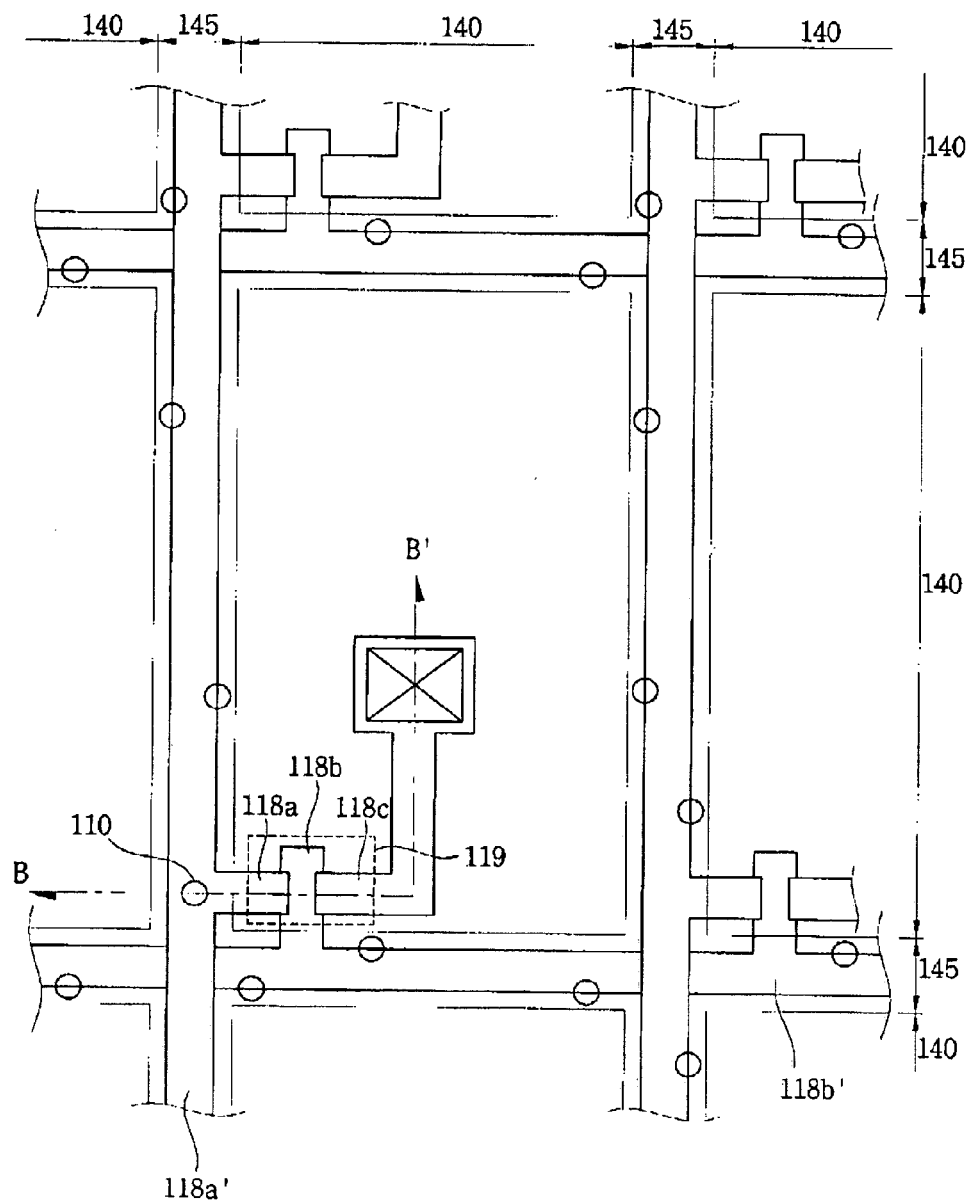
FIG. 6 shows a plan view of a liquid crystal display apparatus according to a third exemplary embodiment of the present invention.
Figure 7:
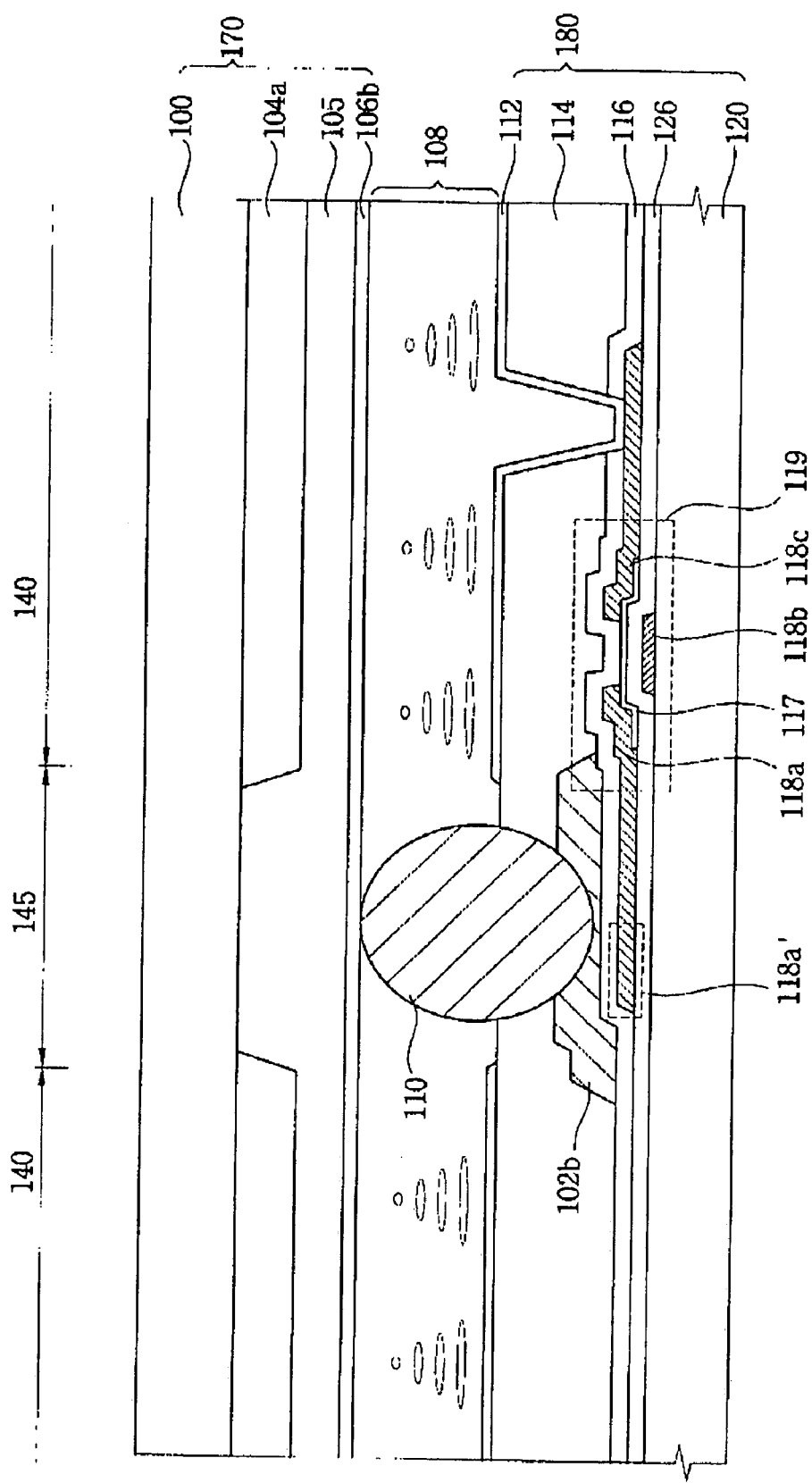
FIG. 7 shows a cross-sectional view taken along the line B-B' of FIG. 6.

FIG. 6 shows a plan view of a liquid crystal display apparatus according to a third exemplary embodiment of the present invention. FIG. 7 shows a cross-sectional view taken along the line B-B' of FIG. 6. In FIGS. 6 and 7, the similar reference numerals denote the similar elements in FIG. 1 and the detailed descriptions of these elements may not be repeated.

Referring to FIGS. 6 and 7, a first substrate 170 includes an upper substrate 100, an overcoating layer 105, and a common electrode 106b. A second substrate 180 includes a lower substrate 120, a TFT 119, a source line 118a', a gate line 118b', a gate insulating layer 126, a passivation layer 116, a black matrix 102b, an organic layer 114, and a pixel electrode 112.

The color filter 104a is formed on the upper substrate 100 to selectively transmit light of a predetermined wavelength. The overcoating layer 105 is disposed on the upper substrate 100 on which the color filter 104a is disposed, thereby reducing a step-difference between the color filter 104a and the upper substrate 100. The common electrode 106b is disposed over the overcoating layer 105.

The black matrix 102b is disposed on the passivation layer 116 corresponding to the light blocking area 145 so as to block the light. The granular light-blocking spacer 110 is attached to the lower substrate 120 via the black matrix 102b and the organic layer 114.

The organic layer 114 is disposed over the passivation layer 116 and includes a via hole through which the drain electrode 118c is partially exposed. The passivation layer 116 and the organic layer 114 insulate the TFT 119 from the pixel electrode 112. Also, the thickness of the liquid crystal layer 108 is adjusted by the organic layer 114 and the granular light-blocking spacer 110.

FIGS. 8A, 8B, 8C, 8D, and 8E show cross-sectional views of a liquid crystal display apparatus according to a third exemplary embodiment of the present invention. More specifically, FIGS. 8A, 8B, 8C, 8D, and 8E represent intermediate process steps for forming a color filter substrate accordingly to the third exemplary embodiment.

Figure 8A:
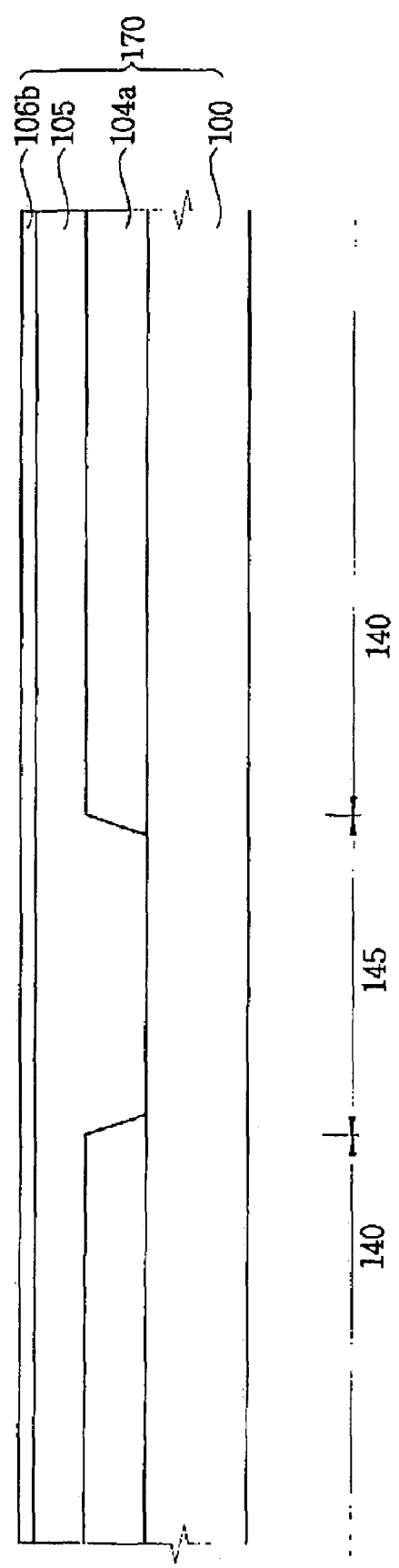
FIGS. 8A, 8B, 8C, 8D, and 8E show cross-sectional views according to a third exemplary embodiment of the present invention.

Referring to FIG. 8A, the pixel area 140 is where an image is displayed and the blocking area 145 blocks light. The color filter 104a is formed in the pixel area 140 by patterning a portion of the formed color filter layer. A transparent organic material is formed on the color filter 104a to form an overcoating layer 105. A transparent conductive material is formed over the overcoating layer 105, thereby forming a common electrode 106b. Accordingly, the first substrate 170 includes the upper substrate 100, the color filter 104a, the overcoating layer 105, and the common electrode 106b.

Figure 8B:
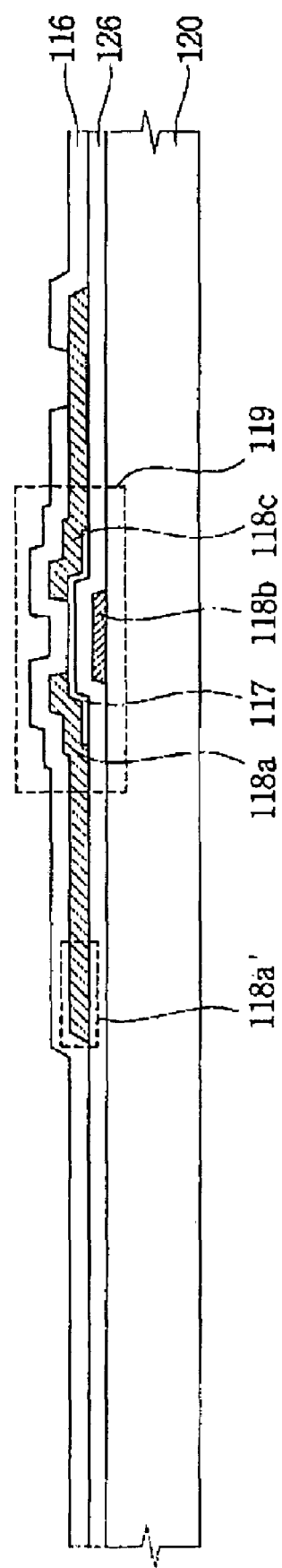

Referring to FIG. 8B, the TFT 119 is formed on the lower substrate 120. A passivation layer 116 is formed on the lower substrate by forming a transparent insulating material. Additionally, a portion of the passivation layer 116 is partially removed in order to partially expose the drain electrode 118c. Accordingly, the TFT 119 includes a source electrode 118a, a gate electrode 118b, a drain electrode 118c, and a semiconductor patterned layer 117.

Figure 8C:
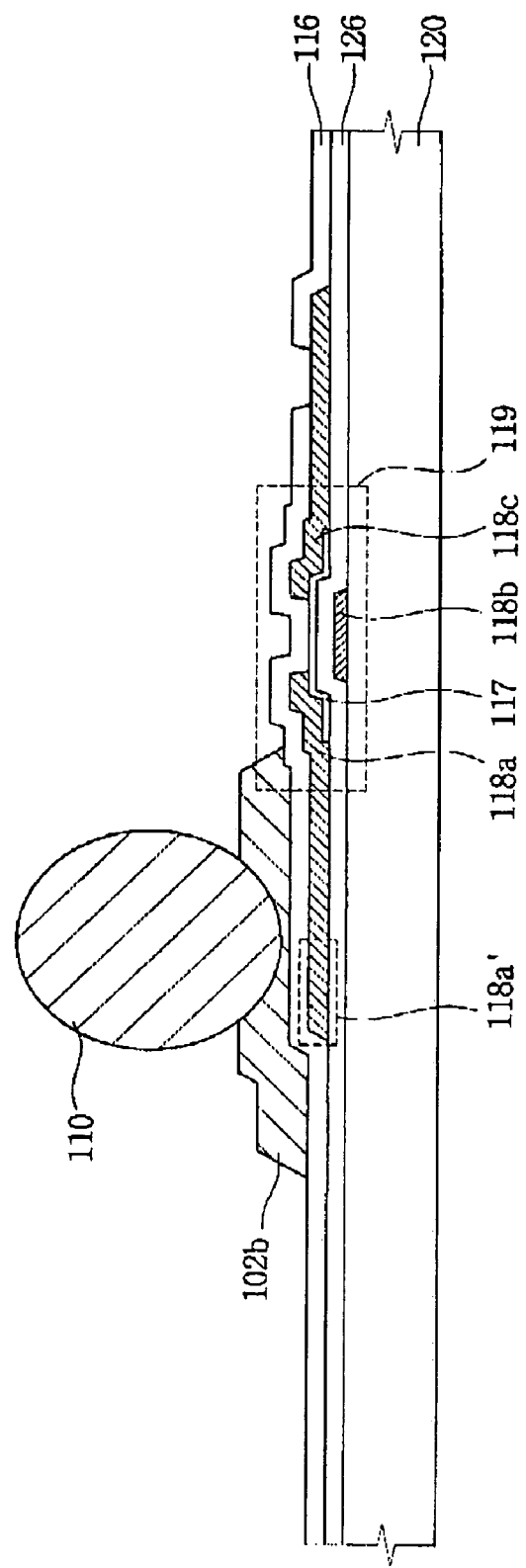

Referring to FIG. 8C, the black photoresist, including the granular light-blocking spacer 110, is formed over the passivation layer 116. The granular light-blocking spacer 110 and the black photoresist may be coated through a slit coating process, spin coating process, and the like. The granular light-blocking spacer 110 is attached on the passivation layer 116 via the black photoresist.

The coated granular light-blocking spacer 110 and the black photoresist are exposed to UV light and developed and patterned such that the granular light-blocking spacer 110 and the black matrix 102b are arranged on the passivation layer 116 in an area that corresponds to the light blocking area 145.

Figure 8D:
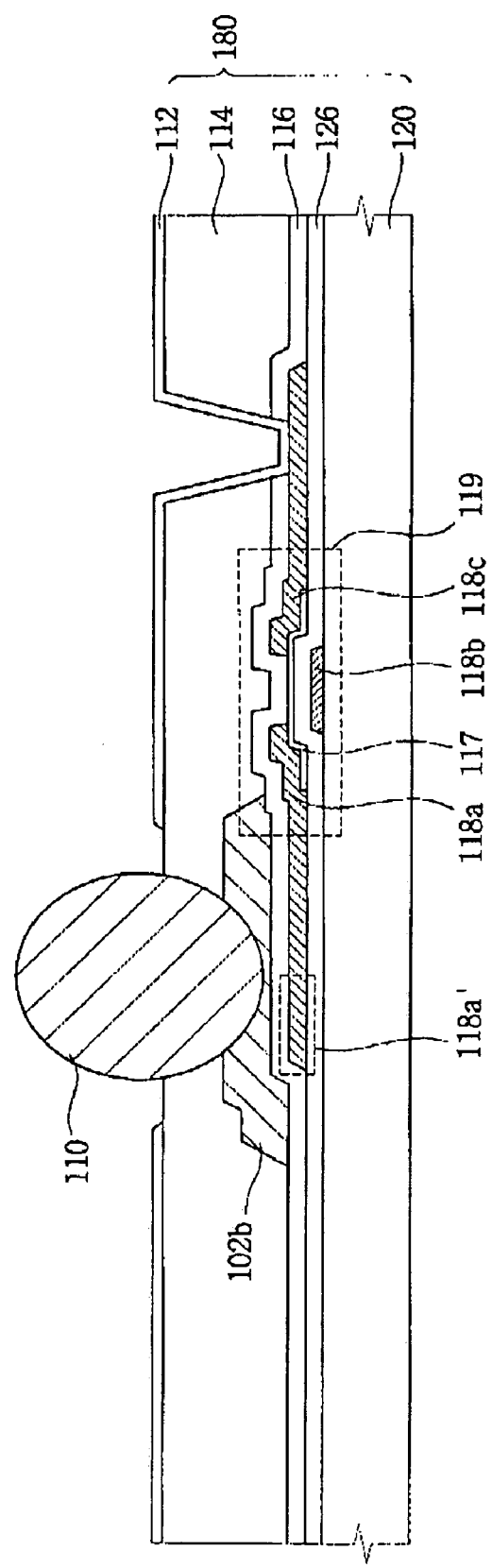

Referring to FIG. 8D, the organic layer 114 having an opening through which the drain electrode 118c is partially opened is formed on the passivation layer 116. Additionally, the granular light-blocking spacer 110 and black matrix 102b are formed on the passivation layer 116.

The transparent conductive material is formed on the organic layer 114 and the passivation layer 116. The transparent conductive material is partially etched through a photolithography process, thereby forming a pixel electrode 112 in the pixel area 140.

Accordingly, the second substrate 180 includes the lower substrate 120, the TFT 119, the source line 118a', the gate line 118b' (not shown), the organic layer 114, the black matrix 102b, and the pixel electrode 112.

Figure 8E:
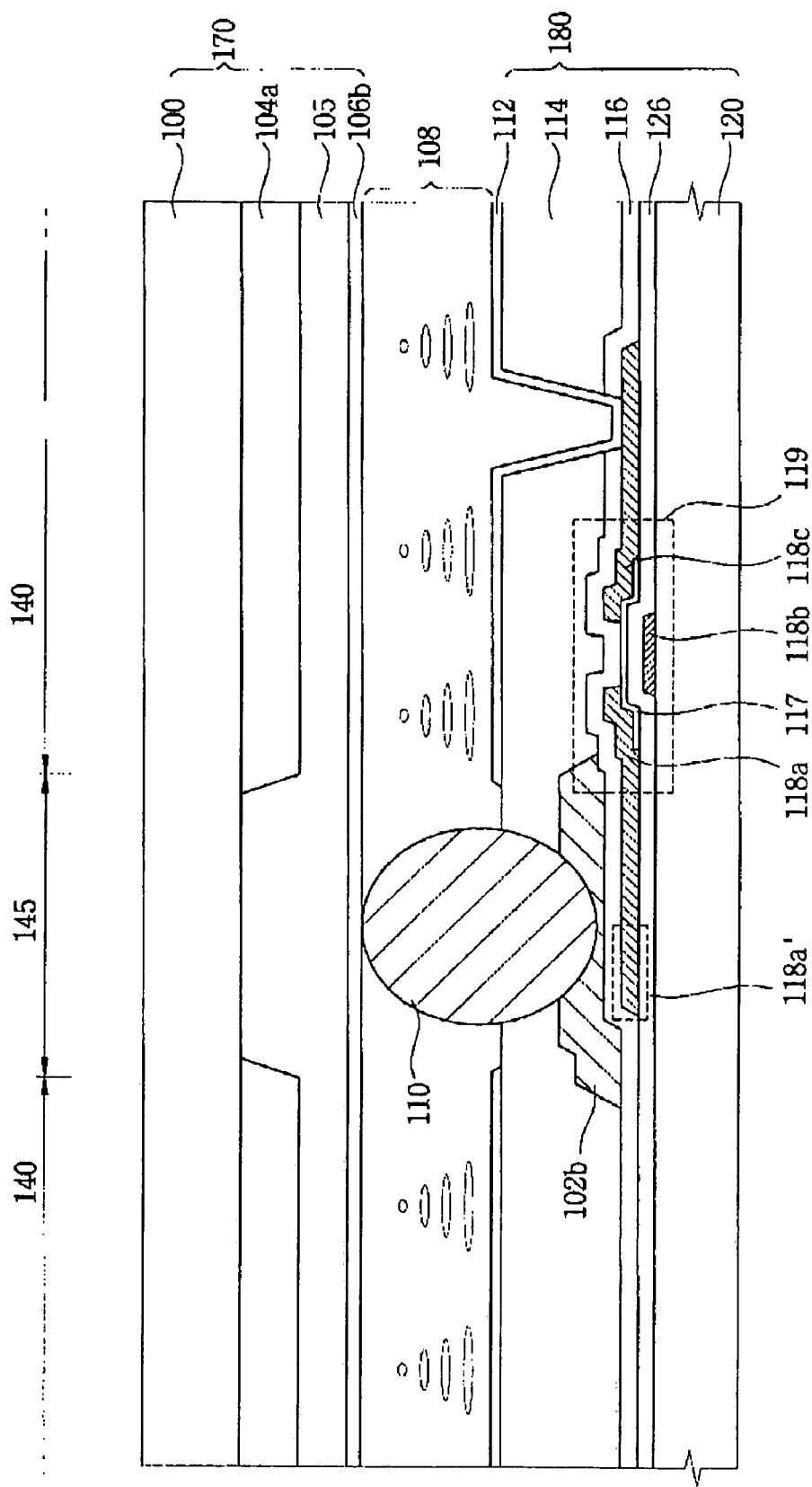

Referring to FIG. 8E, the first substrate 170 and the second substrate 180 are combined with each other and a liquid crystal layer 108 is interposed between the first substrate 170 and the second substrate 180. As the black matrix 102b is disposed over the passivation layer 116, the process of partially removing the common electrode 106b, corresponding to the light blocking area 145, may be omitted. This can prevent the common electrode 106b from being shorted with the pixel electrode 112, even when the first substrate 170 and the second substrate 180 are misaligned.

Figure 9:
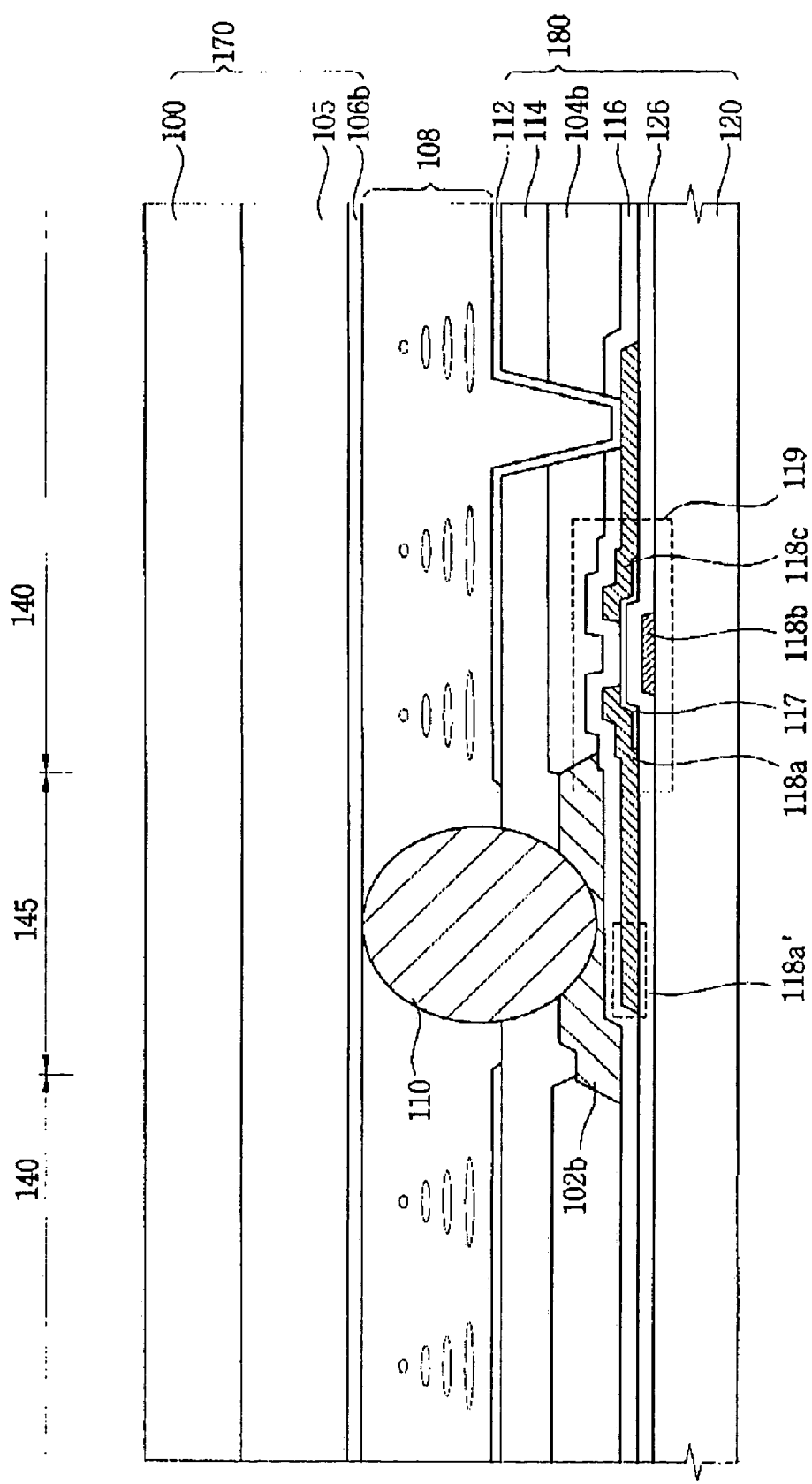
FIG. 9 shows a cross-sectional view of a liquid crystal apparatus according to a fourth exemplary embodiment of the present invention.

FIG. 9 shows a cross-sectional view of a liquid crystal apparatus according to a fourth exemplary embodiment of the present invention. In FIG. 9, the similar reference numerals denote the similar elements as shown in FIGS. 6 and 7 and detailed descriptions of these elements may not be repeated.

Referring to FIG. 9, the first substrate 170 includes the upper substrate 100, the overcoating layer 105, and the common electrode 106b. The second substrate 180 includes the lower substrate 120, the TFT 119, the source line 118a', the gate line 118b' (not shown), the gate insulating layer 126, the passivation layer 116, the color filter 104b, the black matrix 102b, the organic layer 114, and the pixel electrode 112.

In this embodiment, the color filter 104b is arranged between the organic layer 114 and the pixel electrode 112. Alternatively, the color filter 104b may be arranged between the passivation layer 116 and the organic layer 114. Additionally, the organic layer 114 may be omitted entirely from the apparatus.

Referring to FIG. 9, the color filter 104b is arranged between the passivation layer 116 and the organic layer 114, and the black matrix 102b is arranged on the passivation layer 116. Accordingly, the process for partially removing the common electrode 106b corresponding to the light blocking area 145 may be omitted. Although the first substrate 170 and second substrate 180 are misaligned with each other, the alignment of the color filter 104b and the pixel electrode 112 is maintained, preventing the common electrode 106b and the pixel electrode 112 from being shorted.

Figure 10:
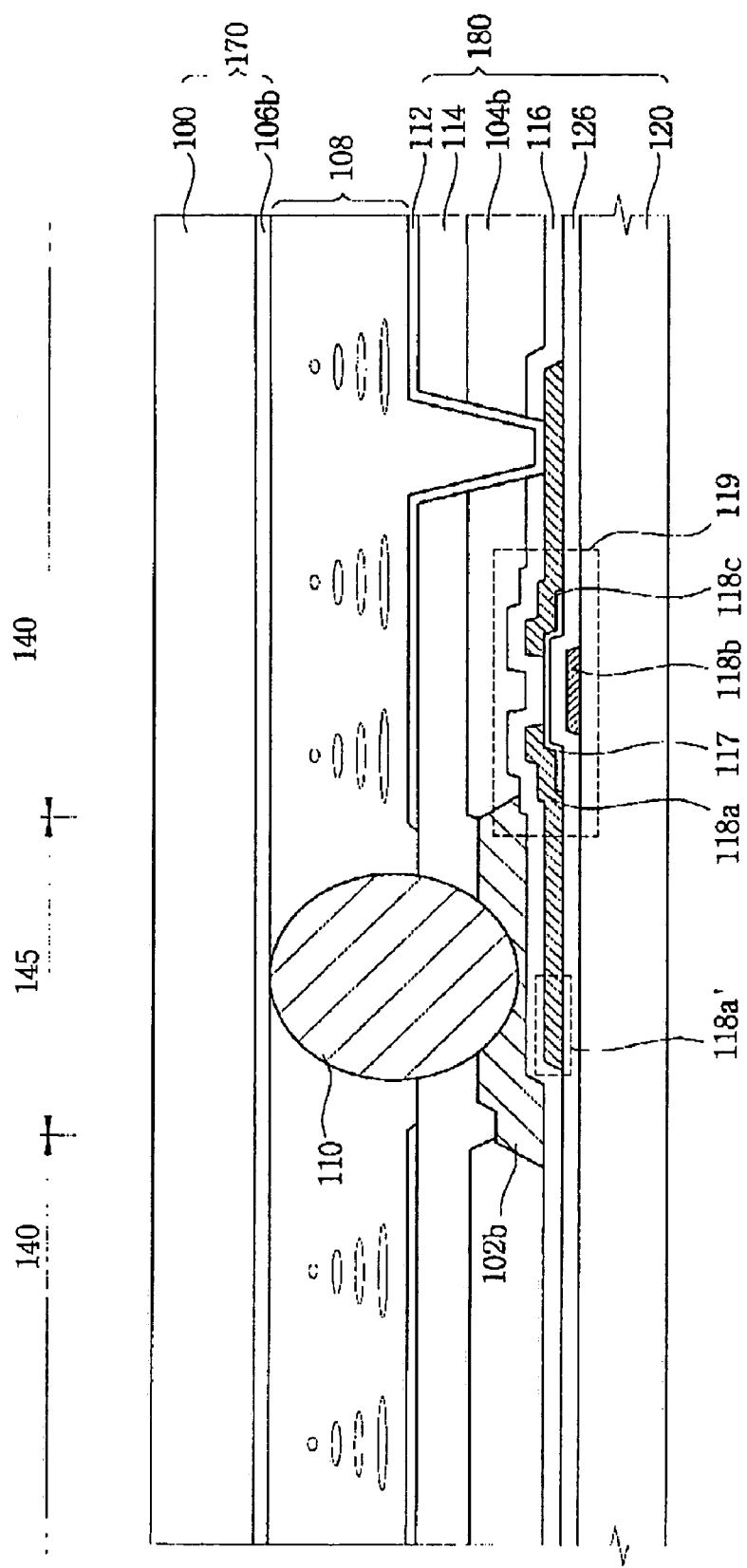
FIG. 10 shows a cross-sectional view of a liquid crystal apparatus according to a fifth exemplary embodiment of the present invention.

FIG. 10 shows a cross-sectional view of a liquid crystal apparatus according to a fifth exemplary embodiment of the present invention. In FIG. 10, the similar reference numerals denote the similar elements as shown in FIGS. 6 and 7 and the detailed descriptions of these elements may not be repeated.

Referring to FIG. 10, the first substrate 170 includes the upper substrate 100 and the common electrode 106b. The second substrate 180 includes the lower substrate 120, the TFT 119, the source line 118a', the gate line 118b' (not shown), the gate insulating layer 126, the passivation layer 116, the color filter 104b, the black matrix 102b, the organic layer 114, and the pixel electrode 112.

The color filter 104b is arranged between the passivation layer 114 and the organic layer 114, and the black matrix 102b is disposed on the passivation layer 116, thereby reducing the step-difference on the upper substrate 100.

The common electrode 106b is arranged on the upper substrate 100. The overcoating layer 105 (not shown) that is typically formed in the other exemplary embodiment is not formed between the common electrode 106b and the upper substrate 100. Omission of the overcoating layer may reduce the LCD apparatus manufacturing cost.

According to an aspect of the present invention, the granular light-blocking spacer is arranged together with the black matrix in the light blocking area, thereby reducing the light leakage and enhancing the image quality of the display. Additionally, the granular light-blocking spacer 110 and the black matrix 102a may be formed together through one process, thereby simplifying the manufacturing processes. Additionally, the elasticity of the granular light-blocking spacer and the granular light-blocking spacer may absorb internal and/or external impacts of the apparatus. Furthermore, as the color filter is arranged between the passivation layer and the organic layer, alignment of the color filter and pixel electrode may be maintained even though the misalignment may occur between the first substrate and second substrate.

Moreover, the black matrix is disposed on the passivation layer to eliminate a process for partially removing the common electrode corresponding to the light blocking area. Although the first substrate and second substrate are misaligned with each other, it also prevents the short circuit between the common electrode and the pixel electrode and the overcoating layer may be omitted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a first substrate divided into a display region and a light blocking region;
    a second substrate arranged opposite said first substrate;
    a color filter formed on the first substrate substantially in the display region;
    a common electrode disposed on the color filter;
    a black matrix formed on the first substrate substantially in the light blocking region;
    a pixel electrode formed on an organic layer; and
    a granular light-blocking spacer comprising an elastic material to absorb impacts of the liquid crystal display apparatus;
    wherein a portion of the black matrix is disposed between the granular light-blocking spacer and the first substrate, the granular light-blocking spacer being attached to the first substrate using the portion of the black matrix being attached to the granular light-blocking spacer; and
    wherein the granular light-blocking spacer is disposed between portions of the pixel electrode and the common electrode, spaced apart from the portions of the common electrode, and in direct contact with the organic layer.

2. The liquid crystal display of claim 1, wherein the black matrix is formed by spin on coating.

3. The liquid crystal display of claim 1, further comprising:
    an overcoating layer formed on said color filter and said black matrix, the overcoating layer being disposed between the common electrode and said color filter.

4. The liquid crystal display of claim 3, wherein said overcoating layer is formed around a portion of said granular light-blocking spacer.

5. The liquid crystal display of claim 3, wherein a portion of said granular light-blocking spacer is formed between said color filter.

6. The liquid crystal display of claim 5, wherein the portion of said granular light-blocking spacer is separated from said color filter.

7. The liquid crystal display of claim 1, further comprises:
    a thin film transistor formed on the second substrate;
    a gate line formed on the second substrate connected to the thin film transistor; and
    a source line formed on the second substrate over a portion of the gate line connected to the thin film transistor.

8. The liquid crystal display of claim 1, wherein the pixel electrode is connected to a drain electrode of the thin film transistor.

9. A color filter, comprising:
    a color filter layer formed on a first substrate;
    a black matrix formed on the first substrate in substantially a light blocking region;
    a pixel electrode formed on the first substrate and disposed on an organic layer, a passivation layer and an insulating layer, the organic layer being between the pixel electrode and the passivation layer; and
    a light-blocking spacer comprising an elasticity,
    wherein a portion of the black matrix is disposed between the light-blocking spacer and the first substrate, the light-blocking spacer being attached to the first substrate using the portion of the black matrix being attached to the light-blocking spacer; and
    wherein the light-blocking spacer is disposed between portions of the pixel electrode and in direct contact with the organic layer.

10. The color filter of claim 9, wherein the light-blocking spacer protrudes from the color filter layer.

11. The color filter of claim 9, wherein the black matrix is formed on a portion of a gate line.

12. The color filter of claim 9, wherein said color filter layer is formed between an over coating layer and the first substrate, and directly on the first substrate.

13. The color filter of claim 9, wherein the light-blocking spacer is in direct contact with a common electrode.

14. The color filter of claim 9, wherein the light-blocking spacer has a geometry selected from the group consisting of a granular shape, a spherical shape, a cube shape, and a polyhedron-like shape.

15. The color filter of claim 9, wherein the light blocking spacer includes synthetic resin having black material.

16. The color filter of claim 15, the black material includes black pigment.

17. The color filter of claim 9, the black matrix includes a photoresist.

18. The color filter of claim 9, the black matrix includes a polycarbonate.

19. The color filter of claim 9, the black matrix include adhesive property for adhering the light blocking spacer.

20. The color filter of claim 19, a width ratio of the light blocking spacer and the black matrix is about 1:3 through about 1:6.

21. The color filter of claim 9, a cross sectional area of the light blocking spacer is below about 20% than a cross section of the black matrix.

22. The color filter of claim 9, wherein the light-blocking spacer is spaced apart from both the pixel electrode and the color filter.

* * * * *